US009677632B2

(12) United States Patent
Baukholt et al.

(10) Patent No.: US 9,677,632 B2
(45) Date of Patent: Jun. 13, 2017

(54) ELECTROMECHANICALLY ACTUATABLE BRAKE AND METHOD FOR OPERATING AN ELECTROMECHANICALLY ACTUATABLE BRAKE

(75) Inventors: Theo Baukholt, Kriftel (DE); Hendrik Powileit, Schmitten (DE); Markus Schommer, Saarbrücken (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 452 days.

(21) Appl. No.: 13/994,484

(22) PCT Filed: Nov. 29, 2011

(86) PCT No.: PCT/EP2011/071265
§ 371 (c)(1),
(2), (4) Date: Jun. 14, 2013

(87) PCT Pub. No.: WO2012/079969
PCT Pub. Date: Jun. 21, 2012

(65) Prior Publication Data
US 2013/0264153 A1 Oct. 10, 2013

(30) Foreign Application Priority Data
Dec. 17, 2010 (DE) .......................... 10 2010 063 320

(51) Int. Cl.
*B60T 13/04* (2006.01)
*F16D 65/52* (2006.01)
(Continued)

(52) U.S. Cl.
CPC ............ *F16D 65/52* (2013.01); *B60T 13/743* (2013.01); *F16D 65/18* (2013.01); *F16D 65/38* (2013.01);
(Continued)

(58) Field of Classification Search
CPC .... F16D 55/00; F16D 55/0004; F16D 55/225; F16D 65/14; F16D 65/18; F16D 65/38;
(Continued)

(56) References Cited

U.S. PATENT DOCUMENTS 2,777,541 A * 1/1957 Larson et al. .................. 188/74
6,257,377 B1 * 7/2001 Schumann ................... 188/72.8
(Continued)

FOREIGN PATENT DOCUMENTS

DE 196 52 229 A1 6/1998
DE 197 50 420 A1 5/1999
(Continued)

OTHER PUBLICATIONS

PCT International Search Report—Nov. 21, 2011.

*Primary Examiner* — Melody Burch
(74) *Attorney, Agent, or Firm* — Brinks Gilson & Lione

(57) ABSTRACT

The invention relates to an electromechanically actuatable brake (2), comprising an electrically actuatable actuator (30) for applying the brake (2) in an application direction (42), which actuator (30) converts a rotary motion of a spindle (20) into a translational motion of an application element (26), in particular a piston, wherein the spindle (20) is driven by an electric motor (8), wherein a mechanical store for storing energy by twisting is provided, the first end of which store is coupled to the spindle (20) and the second end to a bracing element (80), wherein the store takes up energy during rotation of the spindle (20) in the application direction (42), by which energy the spindle (20) is rotated back against the application direction (42) in the currentless state of the electric motor (8), whereby the brake (2) is released.

18 Claims, 3 Drawing Sheets

(51) Int. Cl.
*B60T 13/74* (2006.01)
*F16D 65/18* (2006.01)
*F16D 65/38* (2006.01)
*F16D 65/28* (2006.01)
*F16D 121/24* (2012.01)
*F16D 125/40* (2012.01)
*F16D 125/48* (2012.01)
*F16D 127/02* (2012.01)

(52) U.S. Cl.
CPC ...... *F16D 2121/24* (2013.01); *F16D 2125/40* (2013.01); *F16D 2125/48* (2013.01); *F16D 2127/02* (2013.01)

(58) Field of Classification Search
CPC .. F16D 65/52; F16D 2121/16; F16D 2121/18; F16D 2121/24; F16D 2125/20; F16D 2125/40; F16D 2125/48; F16D 2127/02; F16D 2127/06; B60T 13/74; B60T 13/743
See application file for complete search history.

(56) References Cited

U.S. PATENT DOCUMENTS

| | | | |
|---|---|---|---|
| 6,340,077 B1 * | 1/2002 | Schaffer | 188/156 |
| 6,679,356 B2 * | 1/2004 | Hageman et al. | 188/156 |
| 7,316,300 B2 * | 1/2008 | Danne et al. | 188/72.1 |
| 8,056,683 B2 * | 11/2011 | Usui | 188/31 |
| 8,061,491 B2 * | 11/2011 | Tristano et al. | 188/265 |

FOREIGN PATENT DOCUMENTS

| | | |
|---|---|---|
| DE | 198 07 328 A1 | 9/1999 |
| DE | 102 27 828 A1 | 1/2004 |
| DE | 103 20 884 A1 | 12/2004 |
| DE | 10 2007 046 952 A1 | 4/2009 |
| DE | 10 2007 046 953 A1 | 4/2009 |
| WO | 2004/001254 A1 | 12/2003 |

* cited by examiner

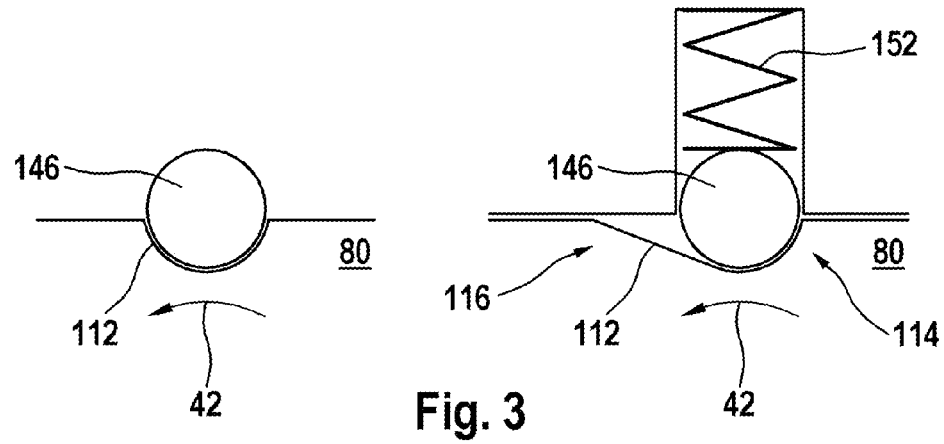
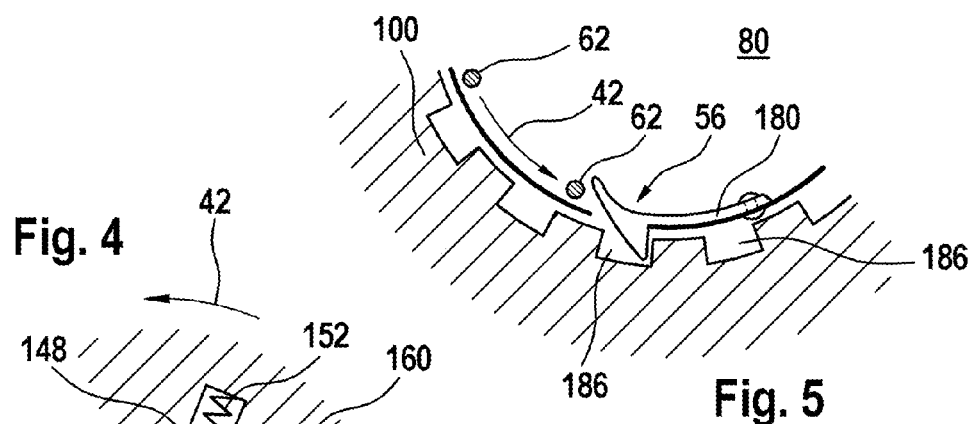
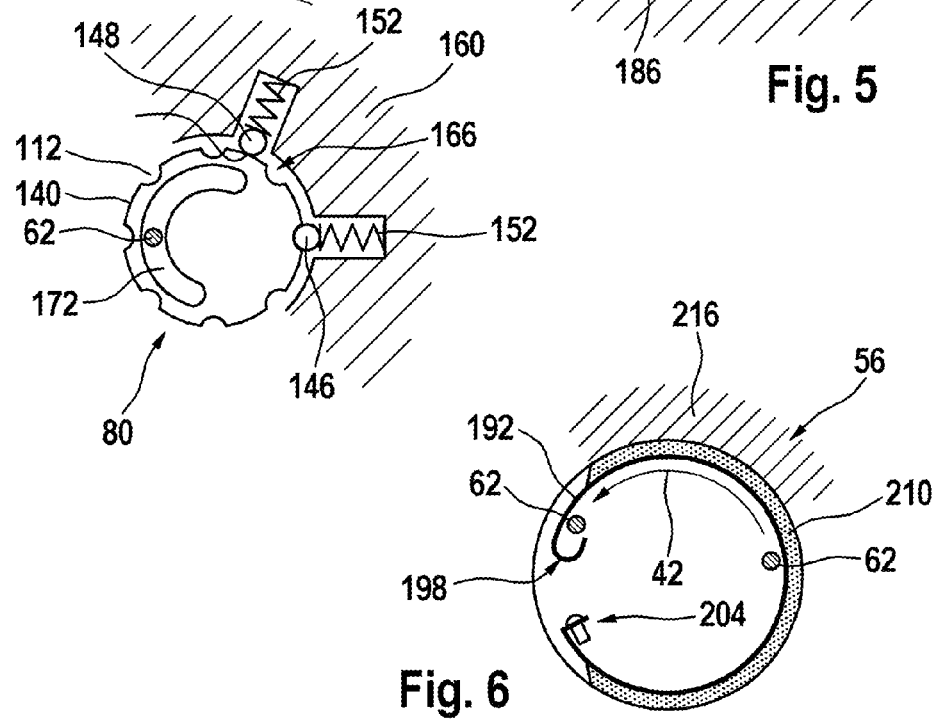

ELECTROMECHANICALLY ACTUATABLE BRAKE AND METHOD FOR OPERATING AN ELECTROMECHANICALLY ACTUATABLE BRAKE

CROSS-REFERENCE TO RELATED APPLICATIONS

This application claims priority to German Patent Application No. 102010063320.8 filed Dec. 17, 2010 and PCT Application No. PCT/EP2011/071265 filed Nov. 29, 2011.

FIELD OF THE INVENTION

The invention relates to an electromechanically actuatable brake comprising an electrically actuatable actuator for applying the brake in an application direction, which actuator converts a rotary motion of a spindle into a translational motion of an application element, in particular a piston, wherein the spindle is driven by an electric motor, wherein a mechanical store for storing energy by twisting is provided, the first end of which store is coupled to the spindle and the second end to a bracing element, and wherein the store takes up energy during rotation of the spindle in the application direction, by which energy the spindle is rotated back against the application direction in the currentless state of the electric motor, whereby the brake is released.

BACKGROUND OF THE INVENTION

Brakes of this type find application, for example, in brake-by-wire brake systems. With such brake systems, direct or immediate access to the brakes by the driver is not possible and is also not desirable. Whereas with usual hydraulic brake systems the driver displaces hydraulic brake fluid into the brakes by actuating the brake pedal, whereby the service brakes are actuated and the vehicle is braked, with brake-by-wire brake systems actuation of the brake pedal, and actuation or active activation of the brakes, are decoupled from one another. With such brake systems, the driver actuates an actuation unit in which the pedal travel is measured by a sensor, for example a pedal travel sensor. This information is then utilized in an electronic control unit to send an application command to the actively activatable brakes. With electromechanically actuatable brakes or electromechanical brakes (EMB), an electric motor is activated for this purpose, its rotary motion being converted by an actuator via a transmission into a translational motion by which, in the case of disk brakes, for example, the brake pads are pressed against the brake disk.

In brake-by-wire systems, comfort functions such as a parking brake functionality which holds the vehicle when parked on an incline, and safety functions such as ABS, can be implemented in a convenient manner. In an ABS control process, for example, the direct decoupling of brake pedal from actuation of the service brakes eliminates the "pumping" of the brake pedal known with hydraulic brake systems.

An important safety criterion or safety-relevant design criterion for brake systems and their associated brakes is the implementation of a fall-back level in the event that important components fail. For example, in hydraulic systems with a brake servo it must be ensured that, in the event of failure of the brake servo, the driver can nevertheless decelerate the vehicle to a sufficient degree by stronger actuation of the brake pedal.

In addition, it must be ensured for safety reasons that the vehicle remains maneuverable in the event of failure of the on-board network. A dynamic situation which must be avoided in all cases is one in which the brakes remain applied in the event of such a system failure. This is especially relevant with brake-by-wire systems. If, for example, the driver has actuated the actuation unit, whereby the electromechanically actuatable brakes have been applied, and if the on-board network now fails, it must be ensured that the brake pads are released again from the corresponding brake disks. If this does not happen the vehicle becomes difficult or even impossible to control and can go into a skid, especially when the road surface has a low coefficient of adhesion.

In order that the brake pads are released from the brake disks in such a case of on-board network failure, a corresponding mechanism which performs this function should be present in an EMB. Such a mechanism must not be dependent on a voltage supply from the on-board network since this is just what is not available in such a situation. The mechanism should serve to release the brake pads precisely in the currentless state of the brake by means of a separate current supply or by mechanical means.

Consequently, electric brakes must switch in the event of failure to a safe state free of braking torque. This requirement must be fulfilled in a very short time (50 ms for front wheel brakes, approximately 500 ms for rear wheel brakes) in order that the lateral grip of the wheel concerned, and therefore the steerability and stability of the whole vehicle, are not dangerously impaired. As long as the drivetrain of the electric wheel brakes continues to be activatable in a controlled manner, freedom from braking torque can be obtained by active retraction of the brake pad in the event of a critical fault, for example failure of the force sensor. If, however, the energy path to the wheel brake actuator is interrupted by a fault in the on-board network, in the electronic control system or in the electric motor itself, or if failure of the drivetrain is present for another reason, the brake must be configured to be self-opening without an external energy supply, that is, in a currentless state, and must react according. The "currentlessly self-opening" property makes the brake intrinsically safe and, in the event of software faults, also makes possible advantageous external switching-off by an external control device which causes interruption of the current supply to the wheel brake.

If no electric energy supply is available, the safe, braking-torque free state must be attained using the mechanical energy (expansion of the brake caliper) introduced into the system during the braking process. Since low mechanical efficiency may arise in the back-rotating electromechanical system under unfavorable conditions (for example, low ambient temperatures or increased friction through wear), in the event of failure either an excessive residual braking moment is therefore applied to the wheel, or the time needed to fall back below a given limit value is too great.

It is therefore necessary to implement an independent energy store which makes available a certain minimum quantity of energy in the event of failure in order to make possible reliable opening of the brake within a prescribed time.

With known electromechanical brakes, the energy stored in an energy store which is independent in this way cannot automatically or autonomously adjust itself to the wear situation of the linings or brake pads, or the adjustment mechanism is configured in such a way that the spindle must be rotated through a given angle before automatic opening of the brake in the event of failure can be reliably implemented. An electromechanically actuatable disk brake in which releasing of the brake pad from the brake disk is effected by a spring energy store in the currentless state of the electric motor is known, for example, from DE 198 07 328 C2.

INTRODUCTORY DESCRIPTION OF THE PRESENT INVENTION

It is therefore the object of the invention to provide an electromechanically actuatable brake, in particular for motor vehicles, which automatically adapts itself to the wear situation of the brake linings and in which, independently of the overall rotation angle through which the spindle has passed, the spindle can be rotated back by a given angular amount in the event of failure without the torque generated by the energy store becoming too great or the drive motor having to be dimensioned too large. Furthermore, an operating procedure for such an electromechanically actuatable brake is to be specified.

With regard to the electromechanically actuatable brake, this object is achieved according to the invention in that the bracing element is mounted rotatably and can be fixed in a plurality of discretely or continuously arranged fixing positions.

Advantageous configurations of the invention are the subject matter of the dependent claims.

The invention starts from the consideration that an emergency release mechanism for electromechanically actuatable brakes which retracts the brake pads from the brake disk—or, in a more general sense, releases the brake—in the event of a fault must meet various safety requirements. For example, an energy store used in such a mechanism should make available a minimum quantity of energy which is necessary in order to reach a released condition of the brake safely and reliably. In addition, the stored energy should be limited to a maximum value, so that sufficient energy is available for a braking process. Moreover, such an energy store should be able to deliver its stored energy independently, that is, without external intervention.

Like all the other components, the energy store should be reusable. It should be possible to carry out a predefined minimum number of emergency release operations without damage to the components and assemblies involved. It must under all circumstances be avoided that, when the brake piston is moved in any direction by the energy stored in the energy store, automatic application of the brake occurs. In other words: the energy store must under all circumstances remain without active function during normal operation of the service brakes but, on the other hand, should reliably release the stored energy, and thereby cause the brake to be released, in an emergency situation.

Furthermore, an emergency release mechanism for the brake must be fail-resistant and diagnosable. Safety-critical faults must either be detectable through diagnosis or must have an extremely low probability of occurrence (fault occurrence probability less than $10^{-9}$). Dormant faults are entirely inadmissible.

A further important requirement for such an emergency release mechanism is that it functions reliably and with predetermined or predictable effectiveness as wear increases. Thus, worn brake linings require that the spindle must rotate somewhat further in the application direction than with new brake linings as the brake is applied. A normal energy store which is charged with energy in the application direction of the brake would therefore take up more energy with worn brake linings than with new brake linings. Less energy would therefore then be available for actually applying the brake. In addition, this energy quantity should not increase too much, so that the brake piston is not retracted too quickly or too strongly upon release of the energy stored in the energy store in the event of an emergency release, and assemblies lying in this retraction direction are not damaged.

As has now been recognized, the aforementioned requirements can be fulfilled in that the bracing element to which the energy store is fastened is mounted rotatably and can be fixed in a plurality of positions. This provides the possibility within the emergency release mechanism of moving and locking the bracing element in a position such that the desired and predefined quantity of energy can be stored in the energy store. If, in this case, the brake linings are somewhat worn, so that the spindle must be rotated somewhat further in the application direction in order to apply the brake, the bracing element can be moved to a position such that the same quantity of energy is stored in the store as in the case of unworn brake linings and the position of the bracing element corresponding thereto. As a result of these measures the emergency release mechanism is made capable of reliably utilizing exactly the predefined and necessary quantity of energy in order to release the brake. The brake can therefore be retracted reliably and at all times at least into the clearance zone, a distance of approximately 0.2 to 0.3 mm existing in a disk brake between brake lining and brake disk.

In a preferred embodiment, the store is in the form of a spiral spring. A spiral spring can be fastened in an optimized and space-saving manner by its outer or first end to the head of the spindle, at the end of the spindle oriented away from the brake pads, and by its inner or second end to the bracing element. In addition, a spiral spring is failure-resistant and requires little maintenance. It needs to be replaced only after a large number of emergency release operations. Spiral springs are used, for example, in electromechanical throttle plate actuators in order to close the throttle plate reliably if the supply voltage is interrupted. Here, the spiral spring is pretensioned during assembly so that the requirement to be "currentlessly self-closing" is fulfilled under all operating conditions (in particular low temperature), and also in the case of small deflections. The maximum angle of rotation between the "throttle plate open" and "throttle plate closed" positions is approximately 90°. The servomotor is dimensioned such that it is powerful enough to work against the spiral spring within the angular range utilized. Similarly, in the electromechanically actuatable brake the spiral spring is pretensioned in the operating state so that it rotates the spindle back and releases the brake in the event of failure of the on-board network. The bracing element is preferably in the form of a disk, this disk and the spiral spring advantageously being aligned coaxially with one another and coaxially with the spindle. The disk may be mounted, for example, directly behind or below the spiral spring in the stroke direction of the brake piston.

In an advantageous embodiment, the electromechanically actuatable brake has a fixing mechanism which can be actuated by a triggering element connected to the spindle, actuation of which fixing mechanism causes the bracing element to rotate in the application direction and to be fixed or locked in an adjacent fixing position. Such a fixing or locking mechanism allows the energy store to be adjusted autonomously or automatically without large additional forces. In this case a triggering element is connected or fastened to the spindle (for example inserted in it) and can actuate the fixing mechanism in such a way that, when the fixing mechanism is actuated, the bracing element rotates further in the application direction up to an adjacent fixing position and is fixed again therein.

In this case the position of the triggering element on the spindle is advantageously selected such that the fixing mechanism is not quite triggered by the triggering element when the brake is fully applied. If, however, wear of the brake linings has the result that the spindle must be rotated somewhat further in the application direction for a complete application of the brake, the triggering element then actuates the fixing mechanism and causes the bracing element to be rotated in the application direction and therefore to be locked in an adjacent fixing or locking position. Upon renewed application of the brake, the spindle now again rotates so far that the triggering element does not quite actuate the fixing mechanism. This is continued as the brake linings wear further. In this way—through entrainment of the bracing element—it is also ensured that the quantity of energy stored in the energy store does not increase with increasing wear of the brake linings. Regardless of the state of the brake linings, therefore, a known or predefined quantity of energy is stored in the energy store.

The triggering element may be, for example, in the form of a pin which is, for example, welded to the spindle or inserted therein and projects substantially perpendicularly therefrom. The energy store or store is advantageously coupled to the spindle by the triggering element. If a spiral spring is used as the energy store it may be, for example, hooked by its outer end to the pin, for example by means of an eye. Furthermore, the bracing element may have a stop, for example directly for the triggering element or for an eye of a spiral spring, such that, when the spindle is rotated against the application direction (for example when exchanging brake pads), the triggering element, or the end of the energy store fastened thereto, contacts the stop at a certain time and, as the spindle is rotated further, entrains the bracing element, so that from this time onwards the spindle and bracing element rotate synchronously with one another against the application direction. In this way a form of freewheel functionality is provided when the spindle is rotated against the application direction: Whereas the bracing element can be rotated further in the application direction only via actuation of the fixing mechanism (which may be configured, for example, as a latching mechanism), rotation of the bracing element against the application direction is easily possible as a result of a freewheel characteristic of the fixing mechanism (or of the latching mechanism).

In order to implement the above-described functionality, the fixing mechanism may be configured in various ways. In a preferred embodiment, the fixing mechanism includes a latching element connected to the bracing element and having a catch, the bracing element latching in an adjacent latching position on a latching contour when actuated by the catch. That is to say that, when the spindle is rotated in the application direction, the triggering element to some degree presses on or displaces the catch, so that the bracing element, or the latching element connected thereto, is for a short time released from the latching contour. Because of the energy stored in the energy store, for example by the tension in a spring, the rotatably mounted bracing element is rotated further in the application direction until the latching element engages in an adjacent latching position of a latching contour. The fixing mechanism may be designed such that no latching position is skipped (mechanical positive guidance).

The bracing element of the store is supported to an extent via a latching mechanism which can block in a plurality of positions which are implemented by detents in a latching contour. Depending on the angle covered/torque applied (for example, in the case of brake lining wear), the latching mechanism or the fixing mechanism is triggered, moving the bracing element of the store out of the detent in the latching contour. When the fixing mechanism is triggered the store to an extent releases mechanical energy—in the case of a spiral spring, the spring relaxes somewhat—and the latching mechanism is rotated back until it latches in the next position. It can be ensured by positive guidance of the latching mechanism that no latching position is skipped when the mechanism is triggered.

With the use of a latching contour, the fixing mechanism can also be implemented with a spring hook which is connected to the bracing element and engages in detents of a latching contour. In this case the spring hook may have, for example, a projection configured such that, when the spindle rotates, the triggering element moves in the application direction below this projection and thereby lifts the spring hook from the latching contour. Once the spring hook is released from the latching contour the bracing element rotates until the spring hook engages in the adjacent latching position or the corresponding detent and in this way the bracing element is locked once more.

The fixing mechanism may also be implemented with a number of ball catches, each of which has a ball and a spring, which are arranged in a spatially fixed manner in relation to the spindle and at least one of which at a time, in a fixing position, engages in a latching position (detent or recess) of a latching contour connected to or integrated with the bracing element. The respective balls are pressed against the latching contour, for example by a spring. The latching contour has, for example, depressions between which circular segments are located. In such an embodiment the bracing element preferably has an opening for the triggering element, contact with which causes the triggering element to rotate the bracing element in the application direction. As this happens the corresponding ball is pressed out of the recess and the bracing element rotates further because of the energy stored in the store, until the ball latches into the next recess. For this purpose the bracing element may have, for example, an opening shaped like a segment of a circle in which the triggering element, for example a pin, moves freely in the normal operating state. In the case of worn brake pads, for example, the triggering element then presses against an end of the opening or engages therein, whereby the bracing element is released from its latching position and then latches in the next latching position.

The latching contour may have a multiplicity of recesses, in which case, if a plurality of ball catches are used, in a latching position balls may also rest on the latching contour between the recesses in the circular-segment sections. In this way, for a given number of recesses, the resolution can be improved, or the angle through which the bracing element rotates from latching position the latching position can be reduced, by increasing the number of ball catches.

In a further preferred embodiment, the fixing mechanism has a spring which presses itself into a surrounding fixing contour and has at its other end a loop or eye for receiving the triggering element. The spring presses itself outwardly into a contour, somewhat in the manner of a drum brake, the bracing element being locked by the friction between spring and contour. If the spindle is now rotated in the application direction until the triggering element engages in the loop or eye of the spring, the spring is thereby tensioned and partially released from the latching contour, so that, because of its tension, the spring rotates in the application direction inside the latching contour until it once again presses in its new position against the latching contour and locks the bracing element, or holds it in its position. In this case the spring is advantageously in the form of a spiral spring or loop spring; a friction lining by which the fixing effect can be further improved may be provided between the spring and the surrounding fixing contour.

The spring which performs the above-mentioned function in the manner of a drum brake, and a spiral spring which functions as an energy store and implements a form of "back-rotating function" in the currentless state of the brake, may also be embodied as a single component. For this purpose the outer end of the spiral spring may, for example, be configured as a loop spring which presses itself into a surrounding fixing contour and thereby establishes a non-positive connection to the bracing element.

With regard to the method, the above-mentioned object is achieved in that, in order to place the brake im a readiness state, the spindle is rotated by the electric motor through a predefined readiness angle in the application direction and, in order to apply the brake, the spindle is rotated further through a predefined application angle in the application direction. By the rotation of the spindle in the application direction through a predefined readiness angle in order to reach the readiness state of the brake, energy is already stored in the store at this time. It can thereby be ensured that, even in the case of a fault when in the readiness state, for example in the event of a power failure or a failure of the on-board network, the spindle is rotated back by a certain amount by the energy stored in the store, so that it is ensured that the brake pads have been released from the brake disk. The electric motor must therefore permanently make available a small torque even in the readiness moment in order to hold the spindle in this position.

Starting from this readiness state, the spindle is rotated further through a predefined application angle in order to apply the brake. Such a mechanism can advantageously be utilized with disk brakes; however, other applications in which brake linings are pressed against a corresponding brake element are also possible. In an advantageous embodiment of the method in a brake having a triggering element connected to the spindle and a stop connected to the bracing element, in order to exchange the brake pads the spindle is rotated against the application direction while the triggering element presses directly or indirectly against the stop, whereby spindle and bracing element rotate together synchronously. When replacing brake pads, the spindle must be moved back as far as possible against the application direction. As this happens the triggering element presses directly against the stop of the bracing element. A kind of freewheel function is thereby implemented. The energy store retains the pretension set at the factory. In this case the fixing mechanism should be configured in such a way that, in this process step, the bracing element can be rotated against the application direction without significant resistance.

The particular advantages of the invention are that, by virtue of a rotatably mounted bracing element of the energy store, there is provided an electromechanical brake in which, in the case of a fault, an application element, in particular a piston, is reliably and reproducibly retracted without an external electrical power supply and the brake is thereby released. A fixing mechanism for the bracing element which is actuated by a triggering element connected to the spindle makes possible automatic adjustment of the bracing element.

BRIEF DESCRIPTION OF THE DRAWINGS

Further preferred embodiments can be found in the dependent claims and the following description of exemplary embodiments of the invention with reference to drawings in which, in heavily schematized views:

FIG. 3 shows two embodiments of ball catches for a fixing mechanism according to FIG. 4, FIG. 4 shows a fixing mechanism in a first preferred embodiment with ball catches, FIG. 5 shows a fixing mechanism in a second preferred embodiment with a spring hook and a latching contour, FIG. 6 shows a fixing mechanism in a third preferred embodiment with a spring.

Like parts are denoted by the same reference numerals in all the figures.

DETAILED DESCRIPTION OF THE PRESENT INVENTION

Figure 1:
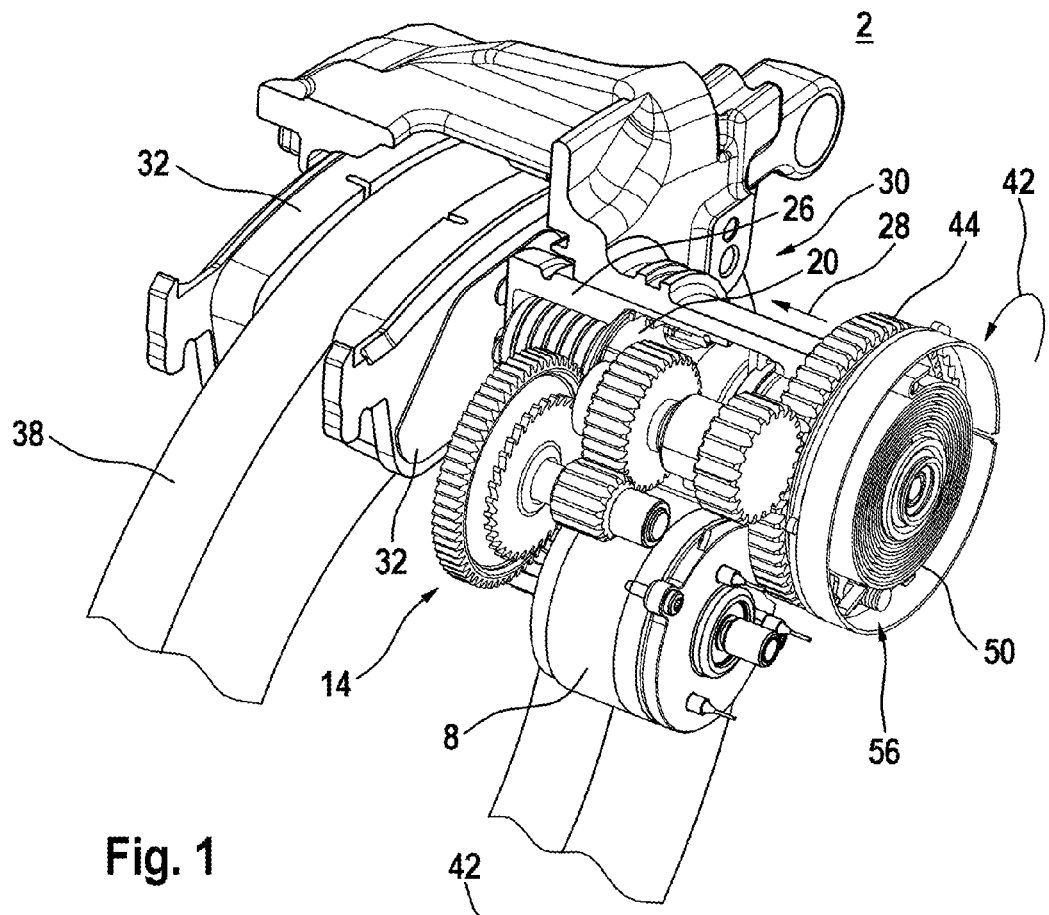
FIG. 1 shows an electrically actuatable brake comprising an electric motor, a transmission, a spindle, a piston and a mechanical store in the form of a spiral spring.

In the electromechanically actuatable brake (EMB) 2 represented in FIG. 1, an electric motor 8 drives via a high-ratio gear transmission 14 a spindle 20, in the form of a recirculating ball spindle, which moves an application element 26 in the form of a piston linearly in a stroke direction 28. The spindle 20 and the application element 26 are parts of an electrically actuatable actuator 30 which converts a rotary motion of the spindle 20 into a translational motion of the application element 26. In the present exemplary embodiment the EMB 2 is in the form of a disk brake for a motor vehicle in which brake pads 32 are pressed against a brake disk 38 as a result of movement of the spindle 20 in the stroke direction 28. This process is also referred to as application of the brake 2. In this process the spindle 20—starting from the fully open position—must perform a plurality of revolutions, depending on the thread pitch and the wear state of the brake pads 32 and of the brake disk 38, in order to build up braking force. A gear wheel 44, via which, as a part of the transmission 14, the spindle 20 is rotated in the application direction 42 by the electric motor 8 in order to apply the brake 2, is rigidly connected to the spindle 20.

Figure 2:
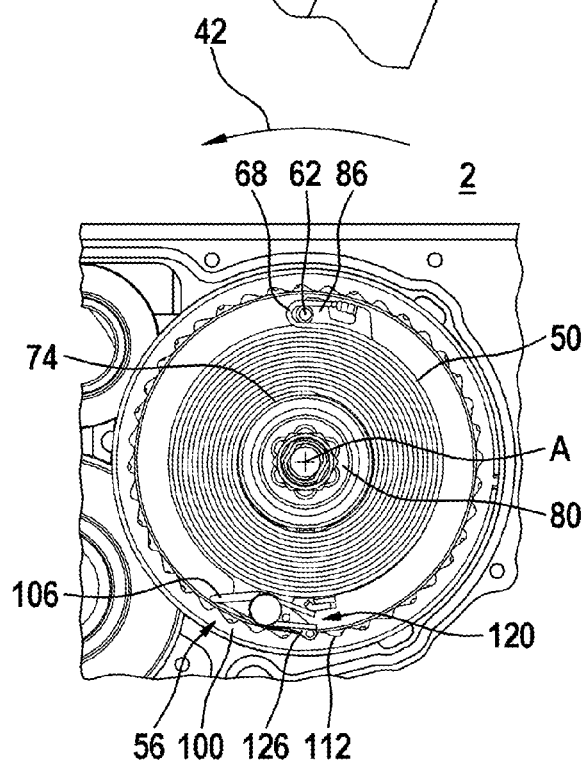
FIG. 2 shows a front view of the brake of FIG. 1 with a spiral spring, a bracing element and a fixing mechanism.

Also visible in FIG. 1 are a spiral spring 50 which functions as a mechanical store and takes up energy as the spindle 20 is rotated in the application direction 42, and a fixing mechanism 56 for the bracing element 80 (not visible in FIG. 1) of the spiral spring 50. The spiral spring 50 is coupled via its first or outer end 68, as shown in FIG. 2, to a pin 62 rigidly connected to the spindle 20. In the present case the spiral spring 50 is hooked to the pin 62 by means of an eye located at its outer end 68. The second or inner end 74 of the spiral spring 50 is coupled to the bracing element 80. This coupling may be implemented by a non-positive or positive connection, for example by hooking, insertion, welding or riveting. The bracing element 80 is in the form of a rotatable disk. Spindle 20, spiral spring 50 and bracing element 80 are aligned coaxially in relation to the axis A. In addition, a stop 86, against which the pin 62 and the outer end 68 of the spiral spring abut at a certain angle of rotation as they move against the application direction 42, is mounted on the bracing element 80.

The electromechanically actuatable brake 2 is designed to make available a defined quantity of energy in order to rotate back the spindle 20 and to release the brake 2 independently of the position of the spindle 20 when the brake 2 is fully applied and independently of the wear state of the brake linings 32 and of the brake disk 38. For this purpose a fixing mechanism 56 by which the bracing element 80 can be fixed in a plurality of positions is provided. To this end a latching element 120, which is connected to the disk-shaped bracing element 80 and includes a pawl 126 which, in a fixing position, engages in a recess 112 or a detent of the latching contour 100, is provided.

By pressing down a catch 106, the pawl 126 is lifted from the recess 112 of the latching contour 100. In this case, because of the tension of the spiral spring 50, the bracing element 80 rotates exactly one latching position further in the application direction 42, until the pawl 126 again latches in a recess 112 adjacent in the application direction 42. The catch 106 is actuated, for example, when the pin 62 and the outer end 68 of the spring move a corresponding distance in the application direction 42 when the brake 2 is applied. It is therefore achieved with the fixing mechanism 56 that, as the rotation angle of the spindle 20 in the application direction 42 increases, for example through wear of the brake linings, the bracing element 80 is adjusted in such a way that the energy stored during application of the brake 2 in the energy store in the form of the spiral spring 50 has substantially the same magnitude in this new position as the energy stored in the preceding position.

An advantageous configuration of the fixing mechanism 56 is represented in FIG. 4. Here, the bracing element 80 includes at its outer edge a series of recesses 112 or detents between which are lands 140. Balls 146, 148 firmly connected to a housing 160 of the brake 2 and supported on springs 152 engage in the respective recesses 112 or rest on the lands 140. In the present example illustrated, the ball 146 is pressed into a recess by the spring 152 while the ball 148 rests on a land 140.

When the bracing element 80 is rotated further in the application direction 42, the ball 148 in the latching position 166 will latch in the corresponding recess 112 or be pressed therein by the spring 152, while the ball 146 comes to rest on a land. As compared to a version with only one ball, therefore, the number of latching positions is doubled. The movement of the bracing element 80 may be effected, for example, by an opening 172 in which the pin 62 moves in normal operation. If the pin 62 abuts the end of the opening 172, the bracing element 80 is thereby rotated in the application direction 42.

Two different embodiments of the recesses 112 are represented schematically in FIG. 3. The recess 112 shown in the left-hand part of FIG. 3 has a substantially semicircular configuration or shape which is symmetrical in relation to its lowest point. It can receive a ball 146 and thereby implement a fixing or locking of the bracing element 80. In this configuration of the recess 112, because of the symmetrical configuration thereof, a movement of the bracing element 80 opposite to the application direction 42 is not facilitated, as compared to a movement in the application direction 42, so that in this case a freewheel functionality is not implemented.

Such functionality is, however, provided with the recess 112 shown in the right-hand part of FIG. 3. Whereas here the recess 112 is configured as a circular segment in a first region 114, it is linear and substantially without curvature in a second region 116. As a result, in the case of a movement of the bracing element 80 against the application direction 42 the ball 146 meets only very low resistance, so that the bracing element 80 can run substantially freely in this direction. In the case of rotation of the bracing element 80 in this direction the ball 146 is pressed in each case into the corresponding recess 112 by the spring 152, and with further rotation can, so to speak, glide upwards in the second region 116 of the recess 112. This naturally also applies to embodiments of the fixing mechanism 56 having a plurality of ball catches.

A further advantageous configuration of the fixing mechanism 56 is represented in FIG. 5. In this case a spring hook 180 engages in detents 186 of the latching contour 100. When the spindle 20 is moved in the application direction 42 the spring hook 180 can be lifted out of a detent 186 by the pin 62, whereby the bracing element 80 continues to rotate in the application direction 42 until the spring hook 180 engages in the adjacent detent 186 and locks the bracing element 80 in its position. Depending on the desired resolution capacity, the number of detents 186 in the latching contour may be increased or decreased in comparison to the example shown. In this embodiment of the fixing mechanism 56 a freewheel function of the bracing element 80 is implemented by the configuration of the spring hook 180, which slides out of the respective detents 186 during a rotation opposite to the application direction 42.

Whereas in the preceding embodiments of the fixing mechanism 56 locking or fixing of the bracing element 80 is made possible at discrete fixing positions, a fixing mechanism 56 which in principle permits continuous variation of the fixing position may alternatively be provided. For this purpose, as shown in FIG. 6, there is provided a spring 192 which may be in the form of a spiral spring or loop spring (in the present case a spiral spring) which has at one end an eye for receiving the pin 62. The spring 192 further has an end piece 204 which is connected to the bracing element 80. If the spindle 20 is rotated a corresponding distance in the application direction 42, the pin 62 engages in the eye 198, thereby stretching the spring 192 and partially releasing it from a friction lining 210 located between the spring 192 and a fixing contour 216. The end piece 204 of the spring 192 thereby slides along the friction lining 210 in the application direction 42 until the tension of the spring 192 has again reached approximately the previous value and the spring 192 again presses against the friction lining 210, whereby locking or fixing of the bracing element 80 is achieved. For this purpose the spring 192 and the spiral spring 50 of the mechanical store must be matched to one another with regard to their elastic force. The use of a friction lining 210 usually ensures greater friction between the spring 192 and a fixing contour 216 preferably made of metal. The material of the friction lining should be selected such that it provides a substantially constant coefficient of friction throughout the service life of the brake 2. Depending on the design of the spring rates of the spiral spring 50 and the spring 192, the use of a friction lining 210 may also be dispensed with. With this implementation of the fixing mechanism a freewheel function is also achieved, since the spring 192 presses itself only slightly or not at all against the fixing contour 216 when the bracing element 80 is moved against the application direction 42.

Figure 7:
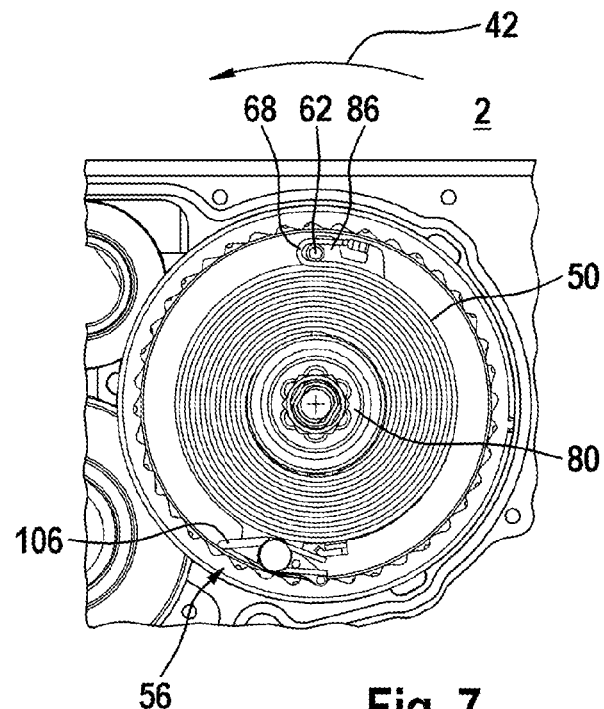
FIG. 7 shows a front view of the brake of FIG. 2 in the currentless state.
Figures 8, 9:
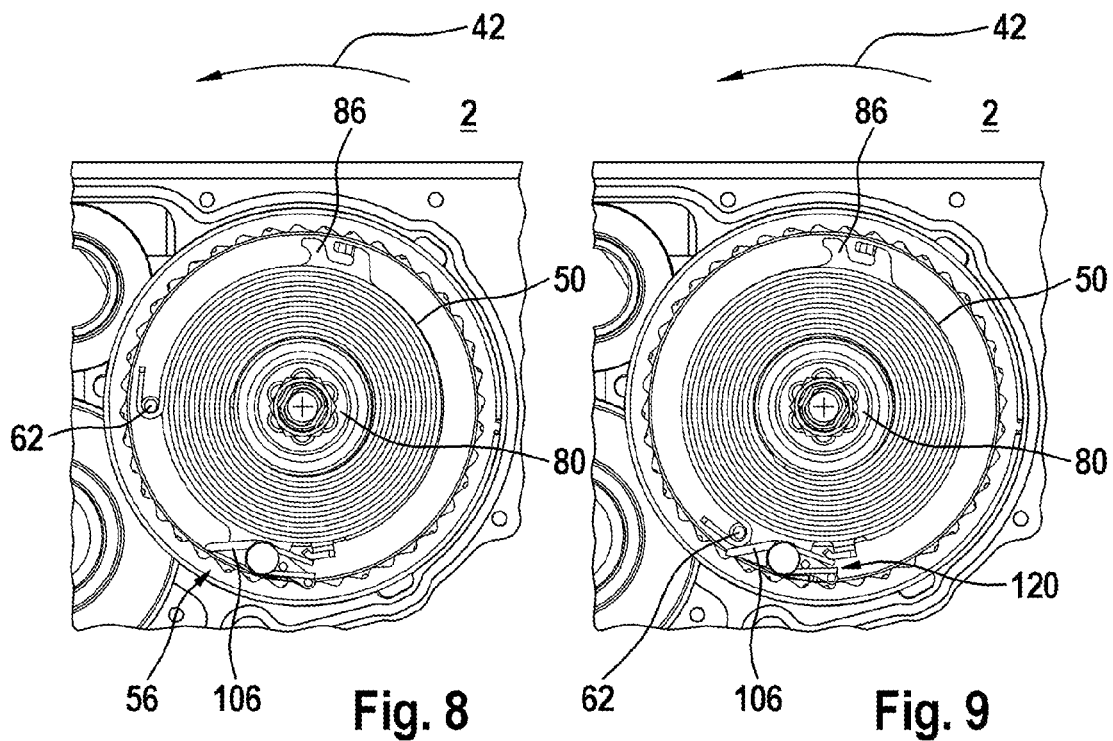
FIG. 8 shows a front view of the brake of FIG. 2 in a readiness state.
FIG. 9 shows a front view of the brake of FIG. 2 in a fully applied state.

FIGS. 7, 8 and 9 show the EMB 2 from FIG. 2 in different operating states. FIG. 7 shows the brake 2 in the currentless state. As a result of its pretension set at the factory, the spiral spring 50 presses the pin 62 and its outer end 68 against the application direction against the stop 86.

In FIG. 8 the brake 2 is in a readiness state. This operating state corresponds to the usual driving operation of a motor vehicle. Here, the pin 62 is approximately midway between the stop 86 and the catch 106 of the fixing mechanism 56. With correct functioning of the brake 2, the electric motor 8 must therefore permanently make available a small torque in order to hold the brake 2 in this position against the back-rotation moment of the spiral spring 50. Starting from the currentless state (FIG. 7), therefore, the spindle 20 must be rotated through a predefined readiness angle in the application direction 42 by the electric motor 8 in order to place the brake in a readiness state. If the current fails during an operating state of the brake 2 as shown in FIG. 8, the spindle 20 is rotated against the application direction 42 by the energy stored in the spiral spring 50 until the pin 62 and the outer end 68 of the spiral spring 50 abut the stop 86.

As the brake 2 is applied, the spindle 20, starting from FIG. 8, is rotated still further through an application angle in the application direction 42. The position of the pin 62 shown in FIG. 9 corresponds to the state of the fully applied brake 2. In the event that a further rotation of the spindle 20 in the application direction 42 is required for full application of the brake, the pin 62 presses down the catch 106, whereby the latching element 120 latches again in a latching position adjacent in the application direction 42 as a result of the tension of the spiral spring 50. In this new starting position of pin 62, fixing mechanism 56, spindle 20 and bracing element 80, a positioning of said components with respect to one another equivalent to the previous state is again ensured, so that the desired predefined quantity of energy is available in the spiral spring 50 for releasing the brake pads 32 from the brake disk 38 in the event of emergency release.

While the above description constitutes the preferred embodiment of the present invention, it will be appreciated that the present invention is susceptible to modification, variation and change without departing from the proper scope and fair meaning of the accompanying claims.

LIST OF REFERENCES

2 Electromechanical brake
8 Electric motor
14 Transmission
20 Spindle
26 Application element
28 Stroke direction
30 Actuator
32 Brake pad/brake lining
38 Brake disk
42 Application direction
44 Gear wheel
50 Spiral spring
56 Fixing mechanism
62 Pin
68 Outer end
74 Inner and
80 Bracing element
86 Stop
92 Spring
100 Latching contour
106 Catch
112 Recess
114 First region
116 Second region
120 Latching element
126 Pawl
140 Land
146 Ball
148 Ball
152 Spring
160 Housing
166 Latching position
172 Opening
180 Spring hook
186 Detent
192 Spring
198 Eye
204 End piece
210 Friction lining
216 Fixing contour
A Axis

The invention claimed is:

1. An electromechanically actuatable brake, comprising:
an electrically actuatable actuator for applying the brake in an application direction, the actuator comprising:
a spindle; and
an application element comprising a piston, the application element coupled to the spindle;
wherein the actuator converts a rotary motion of the spindle into a translational motion of the application element for applying the brake;
an electric motor, wherein the spindle is driven by the electric motor;
a bracing element operatively coupled to the spindle;
a mechanical store in the form of a first spring element for storing energy by twisting the first spring element, the first spring element having a first end coupled to the spindle and a second end coupled to the bracing element such that the bracing element is coupled to the spindle via the store;
wherein the store takes up energy during rotation of the spindle in the application direction, by which energy the spindle is rotatably biased against the application direction in a currentless state of the electric motor, whereby the brake is released in response to rotation of the spindle against the application direction;
wherein the bracing element is mounted rotatably and can be fixed in a plurality of discretely or continuously arranged fixing positions; and
a fixing mechanism which can be actuated by a triggering element connected to the spindle, actuation of which fixing mechanism leads to rotation of the bracing element in the application direction and to fixing thereof in an adjacent fixing position;
wherein the actuation of the fixing mechanism rotates the bracing element in the application direction during the actuation of the fixing mechanism.

2. The brake as claimed in claim 1, wherein the first spring element is in the form of a spiral spring.

3. The brake as claimed in claim 1, wherein the bracing element is in the form of a disk.

4. The brake as claimed in claim 1, wherein the store is coupled to the spindle by the triggering element.

5. The brake as claimed in claim 1, wherein the fixing mechanism includes a latching element which is connected to the bracing element and has a catch, which latching element latches in an adjacent latching position of a latching contour when actuated by the catch.

6. The brake as claimed in claim 1, wherein the fixing mechanism has a spring hook which is connected to the bracing element and engages in a latching contour.

7. The brake as claimed in claim 1, wherein the fixing mechanism has a number of ball catches at least one of which at a time, in a fixing position, engages in a latching position of a latching contour connected to or integrated with the bracing element.

8. The brake as claimed in claim 1, wherein the fixing mechanism has a second spring which presses itself into a surrounding fixing contour and has on its one end a loop for receiving the triggering element.

9. The brake as claimed in claim 8, wherein the second spring element is in the form of a spiral spring or loop spring.

10. The brake as claimed in claim 8, wherein a friction lining is provided between the second spring and the surrounding fixing contour.

11. The brake as claimed in claim 8, wherein the spring element is in the form of a spiral spring and wherein the spiral spring and the second spring are produced as an integral component.

12. The brake as claimed in claim 1, wherein the energy taken up by the store is approximately the same at at least two different fixing positions of the bracing element.

13. The brake as claimed in claim 1, wherein the spindle can rotate to a position beyond a predefined application angle in order to apply the brake, and the energy taken up by the store is approximately the same at this position as the predefined application angle, such that the energy taken up by the store does not substantially increase when rotation beyond the predefined application angle is necessary to apply the brake.

14. An electromechanically actuatable brake, comprising:
an electrically actuatable actuator for applying the brake in an application direction, the actuator comprising:
    a spindle; and
    an application element comprising a piston, the application element coupled to the spindle;
    wherein the actuator converts a rotary motion of the spindle into a translational motion of the application element for applying the brake;
an electric motor, wherein the spindle is driven by the electric motor;
a bracing element operatively coupled to the spindle;
a mechanical store in the form of a first spring element for storing energy by twisting the first spring element, the first spring element having a first end coupled to the spindle and a second end coupled to the bracing element such that the bracing element is coupled to the spindle via the store;
wherein the store takes up energy during rotation of the spindle in the application direction, by which energy the spindle is rotatably biased against the application direction in a currentless state of the electric motor, whereby the brake is released in response to rotation of the spindle against the application direction;
wherein the bracing element is mounted rotatably and can be fixed in a plurality of discretely or continuously arranged fixing positions; and
a fixing mechanism which can be actuated by a triggering element connected to the spindle, actuation of which fixing mechanism leads to rotation of the bracing element in the application direction and to fixing thereof in an adjacent fixing position;
wherein the triggering element is in the form of a pin.

15. The brake as claimed in claim 14, wherein the bracing element has a stop.

16. A method for operating an electromechanically actuatable brake, the method comprising:
providing an electrically actuatable actuator for applying the brake, the actuator including a spindle operatively coupled to an application element comprising a piston;
converting a rotary motion of the spindle into a translational motion of the application element;
driving the spindle by an electric motor;
rotating the spindle through a predefined readiness angle in an application direction by the electric motor in order to place the brake in a readiness state; and
rotating the spindle further in the application direction through a predefined application angle in order to apply the brake;
wherein the brake includes a triggering element connected to the spindle and a stop fastened to a bracing element, wherein, in order to exchange brake pads of the brake, the method further comprises rotating the spindle against the application direction, pressing the triggering element against the stop, and, rotating the spindle and the bracing element synchronously with one another;
wherein the triggering element translates in a rotational direction relative to the stop.

17. The method as claimed in claim 16, further comprising storing a predetermined energy amount in a spring in response to rotating the spindle through the predefined application angle.

18. The method as claimed in claim 17, further comprising rotating the spindle further in the application direction beyond the predefined application angle in order to apply the brake, wherein the predetermined energy amount in the spring remains approximately the same in response to the further rotation.

\* \* \* \* \*